No. 748,646. Patented January 5, 1904.

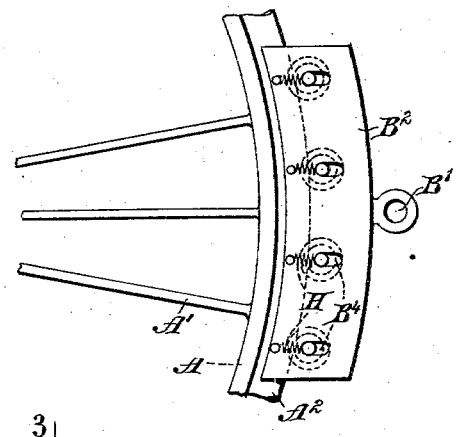
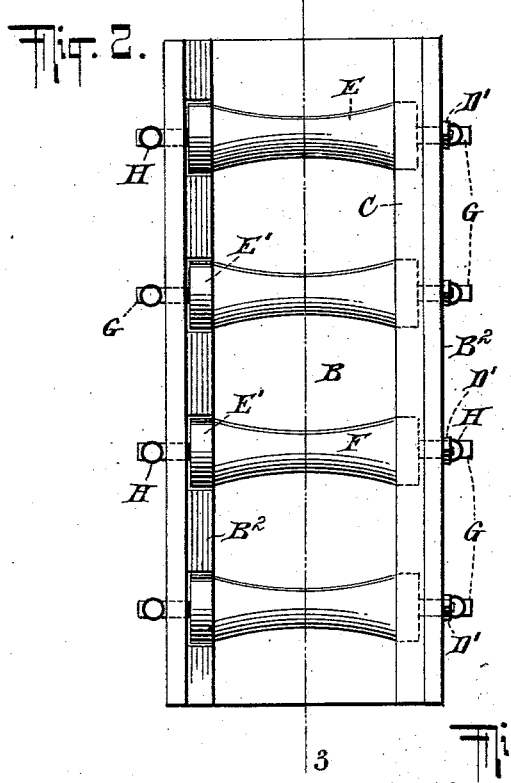
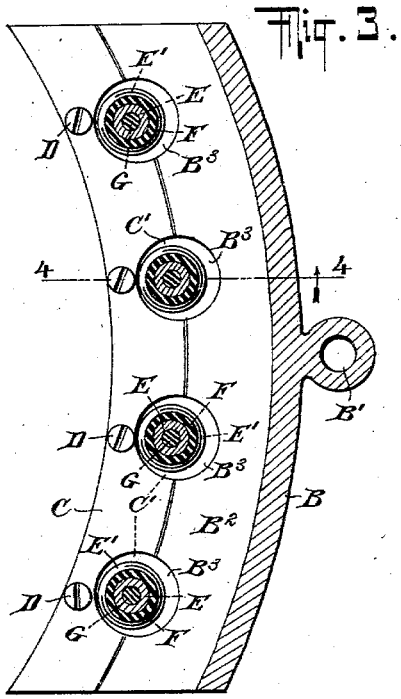
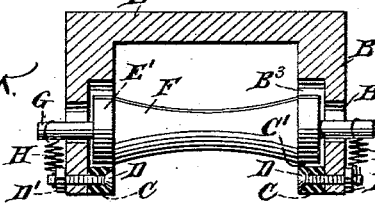

UNITED STATES PATENT OFFICE.

WILLIAM MARTIN PAUL, OF NEW YORK, N. Y.

AUTOMOBILE-BRAKE.

SPECIFICATION forming part of Letters Patent No. 748,646, dated January 5, 1904.

Application filed April 20, 1903. Serial No. 153,383. (No model.)

*To all whom it may concern:*

Be it known that I, WILLIAM MARTIN PAUL, a citizen of the United States, residing in the borough of the Bronx, city, county, and State of New York, have invented certain new and useful Improvements in Automobile-Brakes, of which the following is a specification.

My invention relates to brakes, and is designed for use particularly upon automobiles, although it is capable of a more general application.

The object of my invention is to provide a powerful brake, which will be applied to the tire of the vehicle without danger of injuring the tire and in which provision is made for readily taking apart the members of the brake.

The invention will be fully described hereinafter, and the features of novelty pointed out in the appended claims.

Reference is to be had to the accompanying drawings, in which—

Figure 1 is a side elevation of a wheel with my improved brake applied thereto. Fig. 2 is an inside view of the brake with a retaining member removed. Fig. 3 is a longitudinal section on line 3 3 of Fig. 2, and Fig. 4 is a cross-section on line 4 4 of Fig. 3.

A indicates the rim of the wheel, with the spokes A' and the tire A².

The brake proper comprises a substantially U-shaped frame having a back B, which is provided with an eye B' or with any other suitable device for connecting the brake with its operating device. The frame of the brake, further, has side members B², which are reduced in thickness toward their free edges and which are provided on their inner sides with recesses B³, adjacent to which are located slots B⁴, extending through the side members B². Upon the inner surfaces of the side members B², at the free edge portions thereof, are secured retaining members C, provided with semicircular recesses C', which, together with the recesses B³, form substantially circular seats. These retainers C are removably secured to the side members B² by screws D and nuts D' or other suitable fastening devices. In the circular seats formed by the recesses B³ C' are arranged the heads E' of the brake-rollers E, which are preferably covered with rubber or other relatively soft material, as indicated at F. The rollers are preferably concave, as shown. Each roller is mounted upon a spindle G, which extends through the slots B⁴, so that the roller may move toward and from the free ends of the side members B². For this purpose the heads E' are made of materially smaller diameter than the recesses B³ C'. Springs H, which are connected with the bolts or screws D and with the spindles G, normally pull the rollers toward the free edges of the side members B², so that in the normal position the rollers will be located eccentrically in the recesses B³ C' at those portions of the recesses which are nearest to the tire. (See Fig. 3.) When, however, the brake is moved toward the tire, the rollers will move relatively to the brake-frame and will first engage the tire only with the friction caused by the springs H. Upon a further movement of the brake toward the tire the heads E' will come in engagement with those faces of the recesses B³ which are farthest away from the tire, and this frictional engagement will produce a materially increased braking power. My improved brake is therefore very efficient, yet injury to the tire is avoided, since the rollers will revolve when brought in contact with the tire. It will be understood that the tire projects between the free ends of the side members B². By removing the retainers C and withdrawing the spindles G lengthwise from the rollers, or at least sliding the spindles within the rollers until one of the spindle ends no longer projects, the entire device may be readily taken apart.

Various modifications may be made without departing from the nature of my invention.

I claim as my invention and desire to secure by Letters Patent—

1. A brake, comprising a frame of U-shaped cross-section, provided on the inner surfaces of its side members with substantially circular recesses, brake-rollers having heads located in said recesses and movable bodily toward and from the cross member of the frame, and means for normally keeping said rollers toward the free edges of the said side members.

2. A brake comprising a frame of U-shaped cross-section provided with recesses on the inner surfaces of its side members and with slots leading outwardly from said recesses, rollers provided with heads arranged in said recesses and with spindles extending through said slots and adapted to move therein toward and from the free edges of the said side members, and means for keeping the rollers normally toward the free edges of the said side members.

3. A brake comprising a frame U-shaped in cross-section and provided with recesses on the inner surfaces of its side members, rollers movable bodily toward and from the cross member of the frame and having heads arranged in said recesses, a concave-faced friction-covering located on said rollers between their heads, and means for normally keeping the rollers toward the free edges of the said side members of the frame.

4. A brake comprising a frame having side members with substantially semicircular recesses on their inner surfaces, retainers detachably secured upon the inner surfaces of said side members and provided with substantially semicircular recesses adapted to register with those of said side members, and brake-rollers having heads within said recesses.

In testimony whereof I have signed my name to this specification in the presence of two subscribing witnesses.

WILLIAM MARTIN PAUL.

Witnesses:
HERMAN ROYEMANN,
FREDERICK ECKENFELDER.